United States Patent [19]

Bradshaw et al.

[11] Patent Number: 4,591,123

[45] Date of Patent: May 27, 1986

[54] ADJUSTABLE BRAKE ASSEMBLY

[75] Inventors: Thomas H. Bradshaw, Eastleigh; Ian Golledge, Romsey; John V. Pike, Winchester, all of England

[73] Assignee: International Business Machines Corporation, Armonk, N.Y.

[21] Appl. No.: 396,538

[22] Filed: Jul. 8, 1982

[30] Foreign Application Priority Data

Jul. 20, 1981 [EP]  European Pat. Off. ......... 81303306.5

[51] Int. Cl.⁴ .............................................. A47B 91/00
[52] U.S. Cl. .................................... 248/349; 248/371; 248/418; 248/425
[58] Field of Search ............... 248/349, 179, 180, 393, 248/418, 419, 425, 185, 371, 346, 397, 664, 415, 422, 183, 133, 143, 139, 663; 364/491; 411/538, 537, 535; 188/72.7

[56] References Cited

U.S. PATENT DOCUMENTS

| 277,580 | 2/1885 | Wiseman | D14/114 |
|---|---|---|---|
| 2,922,609 | 1/1960 | Collier | 248/179 |
| 3,614,040 | 10/1971 | Martinez | 248/664 |
| 3,622,112 | 11/1971 | Stroh | 248/183 |
| 3,796,437 | 3/1974 | Nickly | 411/538 |
| 3,834,660 | 9/1974 | Leffler | 248/418 |
| 3,952,843 | 4/1976 | Campbell et al. | 188/72.7 |
| 3,970,792 | 7/1976 | Benham et al. | 248/183 |
| 3,974,994 | 8/1976 | Petterson | 248/181 X |
| 4,019,710 | 8/1977 | O'Connor et al. | 248/181 |
| 4,225,105 | 9/1980 | Nakamura | 248/185 |
| 4,247,069 | 1/1981 | Kurz | 248/185 |
| 4,295,548 | 10/1981 | Quiney | 188/72.7 |
| 4,349,173 | 9/1982 | Volka et al. | 248/183 |
| 4,354,654 | 10/1982 | Werner et al. | 248/663 |
| 4,365,779 | 12/1982 | Bates et al. | 248/179 X |
| 4,368,867 | 1/1983 | Pendelton et al. | 248/678 |
| 4,395,010 | 7/1983 | Helgeland et al. | 248/183 |
| 4,410,159 | 10/1983 | McVicker et al. | 248/183 |
| 4,415,136 | 11/1983 | Knoll | 248/663 |

FOREIGN PATENT DOCUMENTS

| 0016913 | 1/1980 | European Pat. Off. | |
| 0088108 | 9/1895 | Fed. Rep. of Germany | 188/72.7 |
| 2516129 | 10/1976 | Fed. Rep. of Germany | |
| 2288434 | 10/1974 | France | |
| 2261509 | 1/1975 | France | |
| 0810805 | 3/1959 | United Kingdom | 411/537 |
| 1435513 | 5/1976 | United Kingdom | |

Primary Examiner—Ramon S. Britts
Assistant Examiner—Ramon O. Ramirez
Attorney, Agent, or Firm—Frederick D. Poag; Joseph J. Connerton

[57] ABSTRACT

A tiltable and/or rotatable support for a display device includes a cam operated locking mechanism operable to positively clamp the support in a selected swivel and/or tilt position and limiting the amount of tilt and swivel to predetermined amounts. The locking mechanism is operated by means of a lever extending through a horizontal slot in the base and is adjustable to compensate for axial tolerance build-up which could otherwise lead to malfunction. The support may be provided as a stand-alone unit or formed integral with the base of the display device.

6 Claims, 12 Drawing Figures

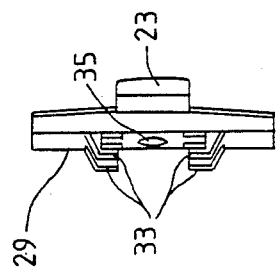
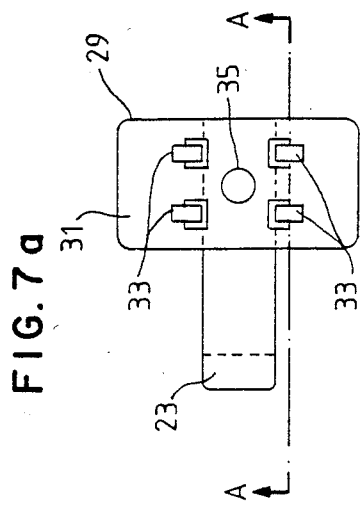
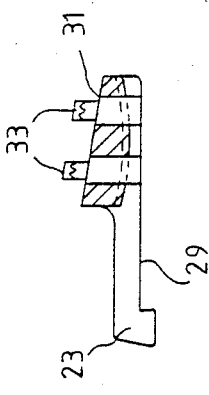

ADJUSTABLE BRAKE ASSEMBLY

FIELD OF THE INVENTION

The invention relates to a tiltable and/or rotatable support for a unit such as a display device.

BACKGROUND OF THE INVENTION

Description of the Prior Art

The IBM 6580 Display Station (IBM is a registered trademark of International Business Machines Corporation) includes a display module which may be swivelled and/or tilted by an operator to adjust the viewing angle. The base of the display module has a central ribbed portion which is shaped to present a spherically contoured convex surface. This module is supported on a plinth which has a central spherically contoured concave surface which mates with the contoured surface on the underside of the module. The two surfaces are slidable, one over the other, to rotate and/or tilt the display module on the plinth. A shaped key-piece extends from the center of the convex surface on the underside of the module through an elongated aperture extending diagonally across the concave surface in a direction from front to back of the plinth. The shape of the key-piece serves to hold the module in place on the plinth while permitting tilting of the module within limits dictated by the key-piece movable within the confines of the elongated slot. Rotation of the module is limited by a projecting lug extending upwards from the base into the spherical convex surface of the module where it engages ribs positioned to define the permitted rotational movement of the module. Wing pieces extend down from each side of the convex surface of the module to contact the plinth to provide lateral support for the module and to limit vibration. Further details of the construction of the tilt and/or rotate feature of the display module are to be found in our co-pending European patent application No. 81101628.6 and corresponding U.S. Application Ser. No. 159,553 filed June 16, 1980, now U.S. Pat. No. 4,365,779.

IBM Technical Disclosure Bulletin Vol. 23, No. 7A, December 1980, pages 2859-60 entitled "Swivel and Tilt Mechanism for Display Unit" by S. Futatsugi and M. Koboyashi, describes a mechanism similar to that incorporated in the IBM 6850 Display Station but additionally having a locking mechanism for clamping the display module, or cabinet, on the plinth, or pedestal, in the selected tilted and rotated position. The locking mechanism consists of a T-shaped shaft, or stopper, mounted for axial movement in a central hole in the concave spherical surface of the plinth and extending through a diagonally positioned elongated slot running from front to back across the convex surface of the underside of the display module. Although axially movable, the T-shaped shaft is otherwise fixed in relation to the plinth with the cross-bar of the shaft aligned parallel to the front edge of the plinth. When assembled, the cross-bar of the shaft is only aligned with the elongated slot in the display module when the latter has been rotated through 90° with respect to the plinth. The T-shaped shaft serves therefore to secure the module to the plinth in all normal viewing positions. The module may be removed from the plinth if desired by rotating through 90° and lifting, allowing the cross-bar of the shaft to pass through the elongated slot. The cross-piece of the shaft is provided on its underside with a hard rubber layer which is normally held in frictional contact with the inside surface of the module base by means of a spring attached to the other end of the shaft exerting a force downwards into the plinth. This has the effect of securing the display module firmly to the plinth and locking the mechanism against inadvertent movement. When it is desired to adjust the display module swivel or tilt position, the clamp is released by means of a cam operated mechanism which lifts the shaft and thus the locking brake, constituted by the rubber coated crosspiece, from engagement with the inside surface of the base of the display module.

SUMMARY OF THE INVENTION

The present invention provides a tiltable and/or rotatable support suitable for a display device with an improved locking mechanism. The support may be in the form of a separate unit on which the display device stands or alternatively, as in the prior art examples, may be constructed with the top of the unit integrally formed as the base of the display device. The same basic principle is used as in the prior art inasmuch as tilt and swivel adjustment is achieved by means of two spherically contoured mating surfaces sliding one over the other.

The locking mechanism is similar to that shown in the prior art inasmuch as clamping is achieved by bringing a brake member into frictional engagement with the inside surface of one of the spherically contoured mating surfaces. The mechanism differs from the prior art in several important respects. First, considerable clamping pressure is needed to ensure that the support will remain locked in a selected tilted position when carrying a relatively heavy load such as a large screen CRT display device. Accordingly, the brake pressure is applied in the present invention by means of a cam device which positively draws the brake into frictional engagement with the surface, exerting a predetermined clamping pressure of sufficient magnitude. For ease of operation, the cam device is lever operated which together with the relatively long travel of the camming surface, compared to the resulting translational cammed movement, provide an operator with considerable mechanical advantage. Second, the most units that are likely to be carried on the support require electrical connections to be made to an external unit. It is therefore desirable, and in some cases essential, to limit the amount of permitted rotation of the support. In the present invention, a limit stop is provided integral with the brake member. The stop and brake member are arranged to rotate with the surface engaged by the brake device. The stop projects beyond the surface to engage detents on the other contoured surface positioned to limit the rotational motion to a predetermined amount.

The various component parts of the support stand and locking mechanism are intended for mass production and accordingly, different tolerances build-up from one unit to another to the extent that at the extremes of variation, the locking mechanism may not work. Accordingly, the locking mechanism includes an arrangement for performing pre-adjustment to eliminate tolerance build-up problems prior to operator use.

In order that the invention may be fully understood, a preferred embodiment thereof will now be described with reference to the accompanying drawings.

BRIEF DESCRIPTION OF THE DRAWINGS

FIGS. 7a, 7b and 7c show views of one component forming the set-up adjustment shown in FIGS. 5 and 6.

DESCRIPTION OF A PREFERRED EMBODIMENT

Figure 1:
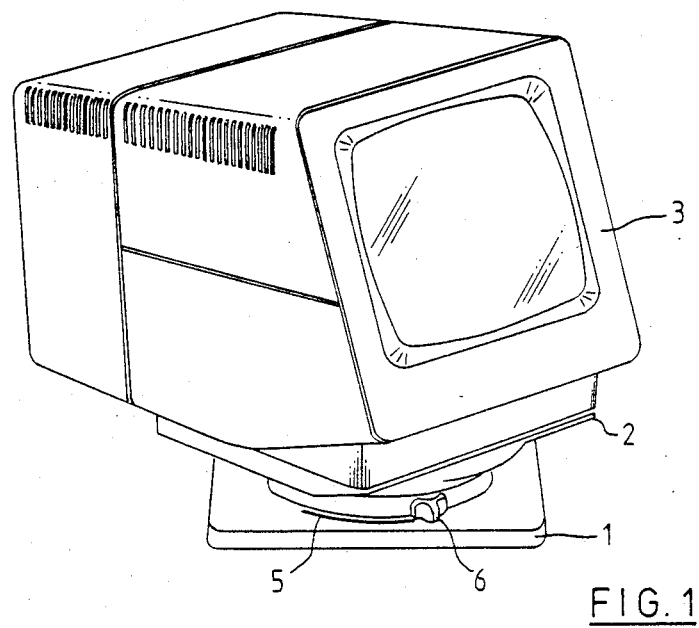
FIG. 1 shows in front perspective view, a CRT display device supported on a tiltable and/or rotatable support stand, according to the invention, in a rotated position.
Figure 2:
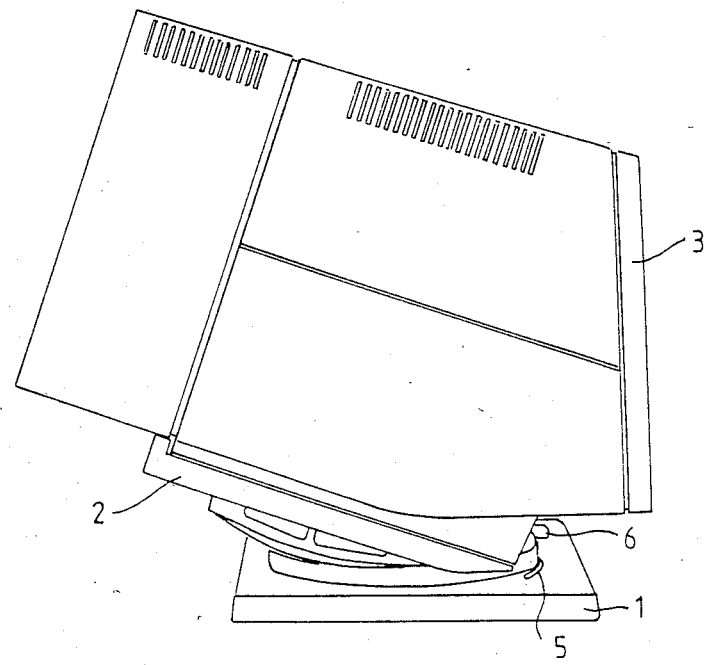
FIG. 2 shows in side perspective view a CRT display device supported on the support stand in a tilted position.

A tiltable and/or rotatable stand according to the invention shown in the FIGS. 1 to 4, consists of two main components, a base member or plinth 1 and a top member or platform 2 upon which a display device 3 or some other unit is supported. The construction of the stand is such that the platform is rotatable through 90° in either direction from the front-facing position, and tiltable from the horizontal 5° in an upwards direction through to 20° in a downwards direction. FIG. 1 shows the stand with swivel adjustment and FIG. 2 shows it with tilt adjustment.

The two components 1 and 2 are held together by means of a novel locking mechanism extending through apertures in both components and operable by means of a lever 4 (FIG. 4) projecting through, and movable along a horizontal arcuate slot 5 in plinth 1. The lever 4 carries a knob 6 shaped to enhance ease of operation. The arrangement according to the invention is such that with the knob 6 in its extreme left-hand position in slot 5, the locking mechanism is released so that the platform 2 is free to rotate, or swivel, and tilt, or pivot, with respect to the plinth 1. With the knob 6 in its extreme right-hand position in slot 5, as shown in FIGS. 1 to 4, the locking mechanism is engaged so that thereafter the platform 2 is locked against tilting, and/or swivelling. A tiltable and/or rotatable support in which the locking mechanism clamps the platform in the selected tilt position but still permits swivel adjustment is described and claimed in our co-pending European patent application No. 81303305.7 filed July 20, 1981 and corresponding U.S. Application Ser. No. 396,537 filed on an even date herewith.

Figure 3:
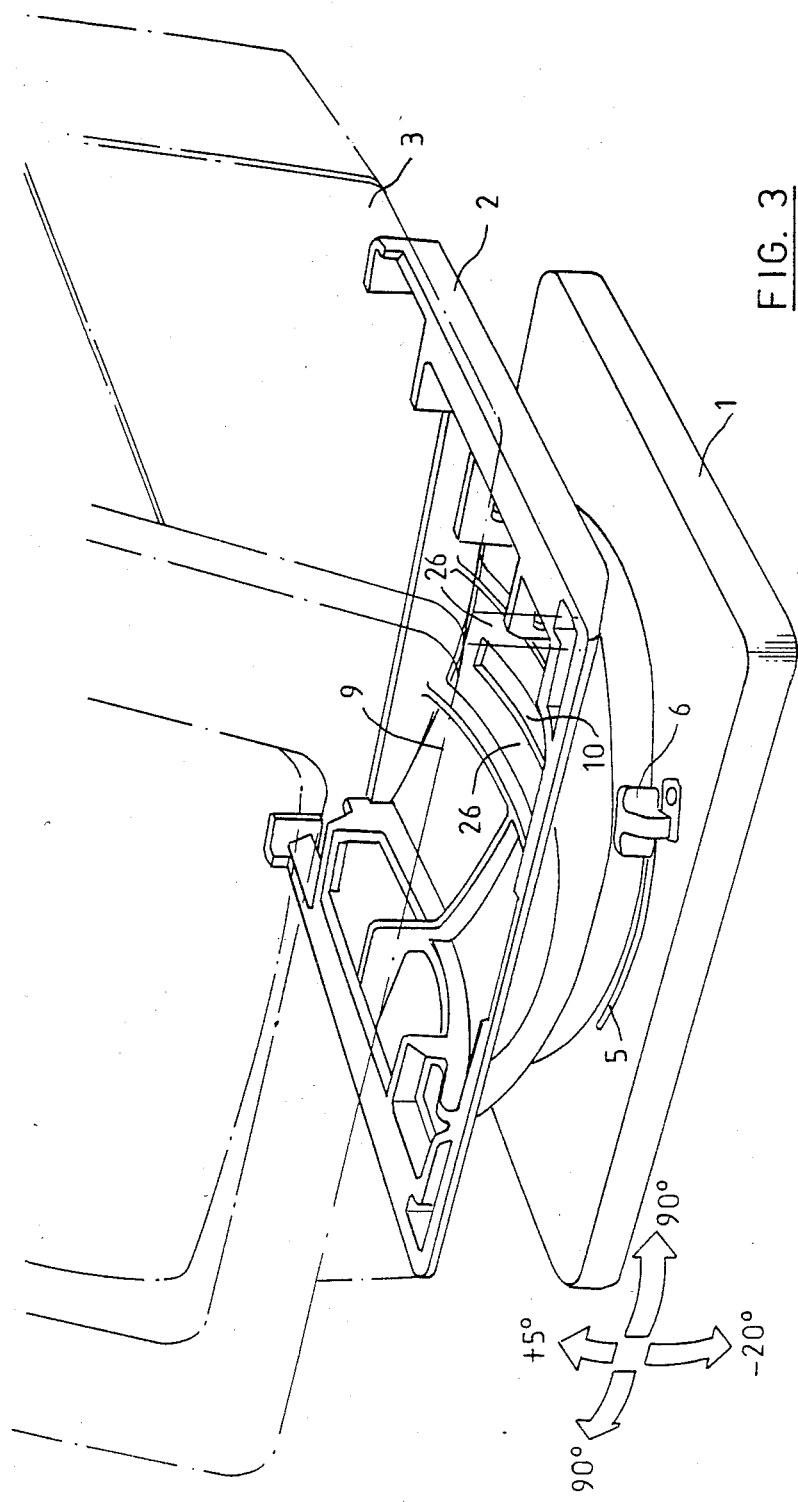
FIG. 3 shows a front perspective view of the support stand in the aligned forward-facing untilted position with a CRT display device, part shown in phantom, in place.
Figure 4:
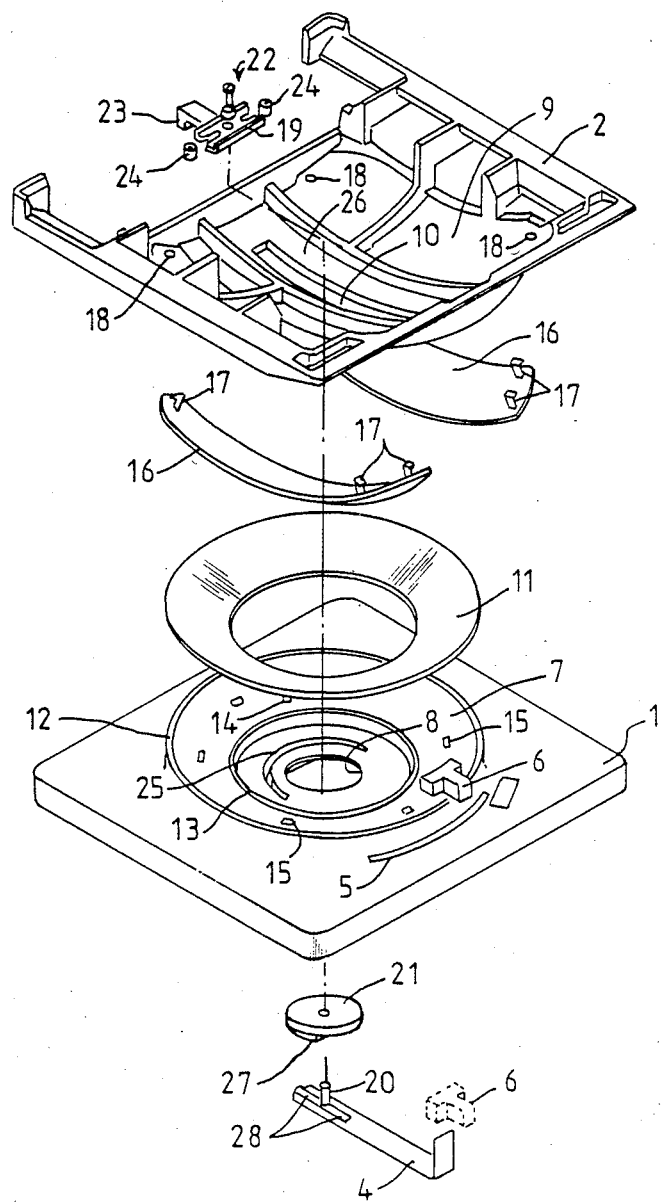
FIG. 4 shows the component parts of the support stand in exploded view.

A detailed description of the construction and operation of the support stand will now be given with reference to the exploded diagram shown in FIG. 4. The plinth 1 is formed as a rectangular base member having a central spherically contoured concave annular surface 7 surrounding a central circular aperture 8. The platform 2 is similarly formed as a rectangular top member having a central spherically contoured convex surface 9 matching the concave surface 7 and having a diagonal elongated slot 10 extending therethrough from the front to the back of the platform. In one form of construction, the top member may be placed in direct contact with the base member with the convex surface of the top member mating with the matching concave surface of the base member. In the preferred embodiment however, the two contoured surfaces are additionally provided with low friction surfaces. Thus, an annular bearing surface 11 of low friction hard wearing material, with a correspondingly contoured profile to that of surface 7, is provided on the surface located between raised concentric rims 12 and 13 themselves formed during the molding of the plinth. The annular bearing surface 11 is secured by a number of integral shaped clips 14 which snap-fit into correspondingly positioned holes 15 in the surface 7. The elongated slot 10 in the surface 9 prevents a similar annular bearing surface being used and accordingly two separate bearing surfaces 16 are provided located one on each side of the slot. The bearing surfaces are secured by further integral shaped clips 17 which snap-fit into correspondingly positioned holes 18 through the surface 9. With the plinth 1 and platform 2 mounted together as shown in FIG. 3, the mating bearing surfaces ensure smooth and each adjustment of the stand by an operator. The locking mechanism according to the present invention serves the dual function of providing a clamping force to lock the platform in a selected tilt and/or swivel position and limiting the amount of tilt and swivel permitted.

The locking mechanism comprises a brake member 19 secured to, but free to rotate on, the free end of an axially topped shaft or spindle 20 extending from the lever 4 and passing through a central hole in a circular cam device 21 and elongated slot 10. The cam device 21 is held as a press-fit in aperture 8. The brake member is secured to the shaft 20 by means of a bolt and retaining washer 22 which, when screwed fully home, provides clearance to enable the brake member to be rotated on the end of the shaft.

Rotational limitation is provided by the free end of a lug 23 integral with and extending backwardly and downwardly from the brake member 19 passes through elongated slot 10 and into an arcuate slot 25 formed in the inner position of surface 7. Since the brake member 19 is constrained by the presence of the shaft to rotate with the platform 2 during swivel adjustment, the amount of adjustment of the platform is determined by the length of elongated slot 10 in the platform which is slidable forwards and backwards about the fixed axis of the shaft 20 and the lug 23. Two brake pads 24 are secured to the underside of laterally extending portions of the brake member 19 to lie above portions of the inside surface 26 of the platform located on each side of and extending parallel to, the slot 10. The underside of the cam device 21 has two identical camming surfaces 27 over which cam followers 28 on lever 4 ride as the lever is moved along slot 5. The arrangement of the mechanism is such that movement of the lever 4 from its extreme left-hand position to the extreme right-hand in slot 5 is accompanied by movement of the cam followers along the camming surfaces, the profile of the latter being such that the shaft 20 is positively drawn axially down through the apertures to clamp the brake pads hard onto the portions 26 thereby locking the platform 2 firmly in the selected rotated and/or tilted position. Since the brake device 19 is permitted to rotate with the platform 2, in those constructions where the friction between the mating contoured surfaces of the platform and the plinth is arranged to be considerably less than the frictional clamping force of the brake member, rotational adjustment of the platform can be made even though it is locked in the tilt position.

Malfunction of the locking mechanism could represent a hazard for an operator and therfore it is important for the mechanism to be accurately set-up to ensure subsequent reliable operation. Clearly, it is an essential feature that the platform position should be adjustable both by tilting and swivelling when the lever is in its extreme left-hand release position but firmly locked against tilting and optionally against swivelling, when in its extreme right-hand locked position.

Figure 5:
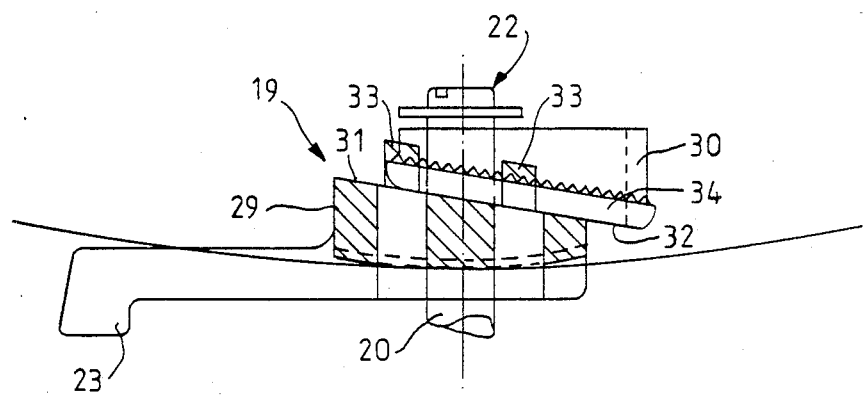
FIG. 5 shows a detail of a locking mechanism modified to include a set-up adjustment for elimination of unwanted tolerance build-up in the mechanism. The detail shown in the fig. shows the mechanism before set-up adjustment has been made.
Figure 6:
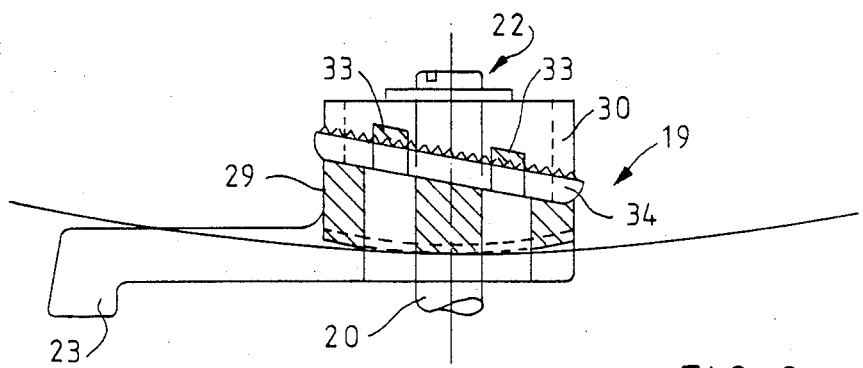
FIG. 6 shows the same detail of the locking mechanism shown in FIG. 5, but after the set-up adjustment has been made.

FIGS. 5 and 6 show a modification to the locking mechanism which enables a vertical adjustment to be made to eliminate undesirable tolerance build-up which may, if uncorrected, cause operational malfunction of the locking mechanism. The modification involves replacing the one part brake member 19 and the two pads 24 shown in FIG. 4 by two separate component parts 29 and 30. The component part 29 is additionally shown as three separate related views in FIGS. 7a, 7b and 7c from which it is seen to be essentially the body portion of the brake member 19 bit with its upper surface 31 inclined at about 10° to the horizontal. The part 29 is made from hard neoprene rubber, which having high frictional properties, dispenses with the need for separate brake pads.

FIG. 7a shows a plan view looking down of the component part 29 of the brake member with integral rotation limit lug 23. FIG. 7b is a section of the plan along A—A. FIG. 7c is a true end elevation view of the part 29 shown in plan view as viewed from the right.

Figure 8A:
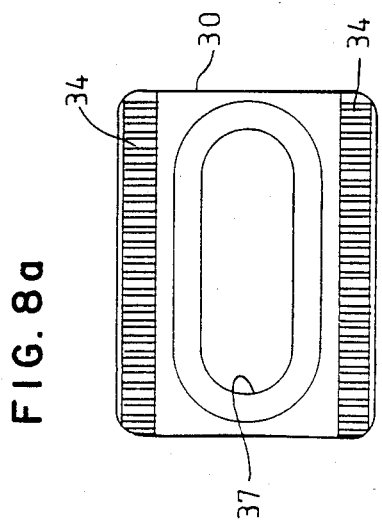
FIGS. 8a, 8b and 8c show views of another component forming the set-up adjustment shown in FIGS. 5 and 6.
Figure 8B:
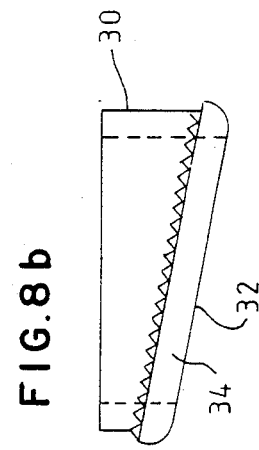
Figure 8C:
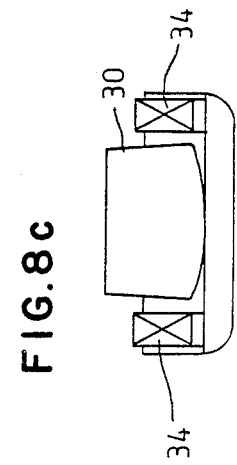

The component part 30 is additionally shown as three separate related views in FIGS. 8a, 8b and 8c from which it is seen to be generally wedge-shaped with its lower inclined surface 32 corresponding to the shape of the surface 31. FIG. 8a shows a plan view looking down of the component adjusting part 30. FIG. 8b shows a side elevation and FIG. 8c shows an end elevation.

Four upwardly and inwardly extending fingers 33 cooperate with rails 34 on each side of the wedge-shaped part 30 to hold the two component parts together while permitting relative sliding of the surfaces 31 and 32 one over the other. The inside surfaces of the inward projecting portions of the fingers 33 and the upper surface of the rails 34 are serrated. The detent effect of the serrations on the fingers with the serrations on the rails serve to restrain the two component parts against slipping from the set-up position. The shaft 20 passes through a central bore 35 in the component part 29 and an elongated bore 37 in the wedge-shaped component part 30. The two parts are held in place on the shaft by bolt and retaining washer 22.

Prior to initial set-up, the locking mechanism is assembled as shown in FIG. 5 so that there is freedom of movement between the locking mechanism components in an axial direction with the bolt 22 screwed hard down onto the retaining washer. To set-up the mechanism to compensate for any tolerance build-up problem, the lever 4 is moved to mid-travel position along slot 5. The wedge-shaped adjuster is then slid up the slope of the part 29 until all clearance is taken up as shown in FIG. 6. The detenting effect of the cooperating serrations on the two parts prevents the mechanism shaking out of adjustment. Movement of the lever to the right applies the brake and movement to the left releases the brake.

What is claimed is:

1. A tiltable and rotatable support for a unit, for example, a display device comprising a base member and a top member having spherically contoured mating surfaces, a shaft mounted for axial movement extending through apertures in the two surfaces, the aperture in one of said surfaces being in the form of an elongated slot, the arrangement being such that the slotted and companion members are rotatable relative to one another about said shaft and tiltable relative to one another by an amount determined by the longitudinal movement of the slotted member about said shaft, and a locking mechanism operable to cause a brake member supported at one end of the shaft to be brought into frictional engagement with the elongated slotted member to clamp said base and top members together, characterized by the combination of a locking mechanism including a camming mechanism connected between the other end of said shaft and the companion member, so as to be operable to positively draw said brake member into frictional engagement with said slotted member to prevent subsequent tilt adjustment of the members, or to release said brake member from said frictional engagement to enable subsequent tilt and rotate adjustment of the members, and a detent means extending from said brake member co-acting with the other member to limit relative rotation of said members.

2. A tiltable and rotatable support as claimed in claim 1, in which said brake member includes a laterally extending member symmetrically pivoted on the end of said shaft, the portions of said laterally extending member projecting on each side of the shaft including parts formed from frictional material for contacting portions of the elongated slotted member lying respectively on each side of said elongated slot and said detent means comprises a lug rigidly attached to and projecting from said brake member through said elongated slot to lie between two rotation limit stops provided on said companion member, the extent of relative rotation between the top and base member being determined by the length of travel of said lug between the stops.

3. A tiltable and rotatable support as claimed in claim 2, in which means are provided for adjusting said locking mechanism at will to compensate for the effect of tolerance build-up of components in the direction of the longitudinal axis of said shaft.

4. A tiltable and rotatable support as claimed in any one of claims 1 to 3, in which said brake member consists of two generally wedge-shaped cooperating parts mounted one upon the other to the end of said shaft and constructed in such a way that movement of one relative to the other increases or decreases the thickness of the brake member in the direction of the longitudinal axis of said shaft whereby tolerance build-up of locking mechanism components in the direction of the longitudinal axis of said shaft can be removed, and means for holding the two wedge-shaped parts in a selected position against relative slipping therebetween.

5. A tiltable and rotatable support as claimed in claim 4, in which said base member has a spherically contoured concave surface with a central aperture, said top member has a spherically contoured mating convex surface with said elongated slot extending diagonally from front to back therethrough, said brake member mounted on one end of said shaft for engagement with said top member and said camming mechanism being attached to the other end of said shaft and retained by said base member, the camming mechanism including a lever extending through a horizontal slot in said base member for operator access, the arrangement being such that horizontal movement of the lever in one direction along the horizontal slot is translated by said camming mechanism into vertical movement effective to clamp said members together as aforesaid and movement in the opposite direction is translated by said camming mechanism into vertical movement effectively release said members as aforesaid.

6. A tiltable and rotatable support as claimed in claim 4, in which said two component parts constituting said brake member are secured to said shaft by a bolt extending through an elongated slot in one component part and a clearance aperture in the other, set-up adjustment of the component parts of said locking mechanism being achieved by sliding said wedge-shaped component parts one over the other to increase the thickness of the brake member sufficiently to eliminate all axial clearance of said components with said lever in its mid-travel position.

* * * * *